US011176825B1

(12) United States Patent
Ghannam et al.

(10) Patent No.: US 11,176,825 B1
(45) Date of Patent: Nov. 16, 2021

(54) SYSTEMS AND METHODS FOR VEHICLE BACKUP WARNING NOTIFICATION (71) Applicant: Ford Global Technologies, LLC, Dearborn, MI (US)

(72) Inventors: Mahmoud Yousef Ghannam, Canton, MI (US); Brian Bennie, Sterling Heights, MI (US); Tony Mark Phillips, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/950,337

(22) Filed: Nov. 17, 2020

(51) Int. Cl.
| G08G 1/16 | (2006.01) |
| H04W 4/38 | (2018.01) |
| B60Q 5/00 | (2006.01) |
| B60Q 9/00 | (2006.01) |
| H04W 4/46 | (2018.01) |
| H04W 4/44 | (2018.01) |
| H04W 4/48 | (2018.01) |

(Continued)

(52) U.S. Cl.
CPC ............. *G08G 1/16* (2013.01); *G08G 1/161* (2013.01); *G08G 1/162* (2013.01); *G08G 1/165* (2013.01); *H04W 4/38* (2018.02); *H04W 4/40* (2018.02); *H04W 4/44* (2018.02); *H04W 4/46* (2018.02); *H04W 4/48* (2018.02); *B60Q 1/525* (2013.01); *B60Q 5/006* (2013.01); *B60Q 9/008* (2013.01); *G08G 1/164* (2013.01); *G08G 1/166* (2013.01); *G08G 1/168* (2013.01); *G08G 1/207* (2013.01)

(58) Field of Classification Search
CPC ........ G08G 1/161; G08G 1/165; G08G 1/162; G08G 1/166; G08G 1/168; G08G 1/164; G08G 1/207; G08G 1/16; H04W 4/40; H04W 4/44; H04W 4/38; H04W 4/48; H04W 4/46; B60Q 9/008; B60Q 1/525; B60Q 5/006

See application file for complete search history.

(56) References Cited

U.S. PATENT DOCUMENTS 8,068,016 B2 * 11/2011 Toh .................. G08G 1/162
340/425.5
8,410,956 B2 * 4/2013 Bai .................. G08G 1/161
340/905

(Continued)

FOREIGN PATENT DOCUMENTS

WO     2019172938 A1     9/2019

OTHER PUBLICATIONS iihs.org, "Park assist helps drivers avoid backing crashes", Feb. 22, 2018, six pages.

*Primary Examiner* — Brian E Miller
(74) *Attorney, Agent, or Firm* — Frank Lollo; Eversheds Sutherland (US) LLP (57) ABSTRACT Vehicle backup warning notification systems and methods are disclosed herein. An example method can include determining a hazardous condition in an operating area around a vehicle based on user input of a first user at a first point in time, storing a warning message that indicates that the hazardous condition is present in the operating area, determining a second user driving the vehicle at a second point in time, determining that the stored warning message exists, and presenting the warning message for the second user driving the vehicle to notify the second user that the hazardous condition is present in the operating area.

20 Claims, 5 Drawing Sheets

(51) Int. Cl.
*H04W 4/40* (2018.01)
*G08G 1/00* (2006.01)
*B60Q 1/52* (2006.01)

(56) References Cited

U.S. PATENT DOCUMENTS

| | | | |
|---|---|---|---|
| 9,269,267 B2* | 2/2016 | Goodwin | G08G 1/162 |
| 9,293,045 B2* | 3/2016 | Bostick | H04W 4/70 |
| 9,652,982 B2* | 5/2017 | Hegemann | G08G 1/0112 |
| 9,820,113 B2* | 11/2017 | Klang | H04W 4/029 |
| 9,832,241 B1* | 11/2017 | Hayward | G01S 19/51 |
| 9,947,149 B2* | 4/2018 | Bonhomme | G08G 1/0141 |
| 9,959,765 B2* | 5/2018 | Thompson | G08G 1/163 |
| 10,055,987 B2* | 8/2018 | Stahlin | G08G 1/096791 |
| 10,140,868 B1* | 11/2018 | Lei | B60W 50/14 |
| 10,171,953 B2* | 1/2019 | Narayanan | G08G 1/205 |
| 10,205,428 B1* | 2/2019 | Paepcke | B60Q 5/008 |
| 10,292,136 B2 | 5/2019 | Rubin et al. | |
| 10,325,490 B2* | 6/2019 | McGrath | G07C 5/008 |
| 2008/0023247 A1 | 1/2008 | Hall | |
| 2010/0019932 A1* | 1/2010 | Goodwin | G08G 1/162 340/902 |
| 2010/0223332 A1* | 9/2010 | Maxemchuk | H04W 4/08 709/204 |
| 2011/0115644 A1* | 5/2011 | Grotendorst | G08G 1/162 340/903 |
| 2011/0227713 A1* | 9/2011 | Amann | G08G 1/167 340/435 |
| 2015/0109104 A1* | 4/2015 | Fadell | H04L 67/12 340/5.65 |
| 2015/0154864 A1* | 6/2015 | Hainzlmaier | G08G 1/162 340/905 |
| 2015/0372832 A1* | 12/2015 | Kortz | H04W 4/60 700/278 |
| 2016/0093207 A1* | 3/2016 | Di Censo | H04R 1/1091 340/944 |
| 2017/0066374 A1* | 3/2017 | Hoye | B60W 30/08 |
| 2017/0217361 A1 | 8/2017 | Miller | |
| 2017/0218678 A1* | 8/2017 | Kothari | B60Q 1/323 |
| 2018/0089997 A1* | 3/2018 | Ho | G08G 1/04 |
| 2018/0151077 A1* | 5/2018 | Lee | B60Q 9/008 |
| 2018/0174452 A1* | 6/2018 | Draper | B60R 25/24 |
| 2018/0366000 A1* | 12/2018 | Wendt | G08G 1/166 |
| 2019/0043358 A1* | 2/2019 | Biehle | G08G 1/0965 |
| 2020/0294401 A1* | 9/2020 | Kerecsen | G05D 1/0287 |
| 2020/0349843 A1* | 11/2020 | Liu | H04W 4/025 |

* cited by examiner

SYSTEMS AND METHODS FOR VEHICLE BACKUP WARNING NOTIFICATION

BACKGROUND

A hazardous condition may exist as a result of an object or condition that is present in or adjacent to a driveway. A first driver may observe an object such as a trashcan or vehicle that potentially obstructs the driveway. A second driver may park their vehicle in the same driveway or may use the same vehicle as the first driver. If the first driver does not warn the second driver of the presence of the object, the second driver may back into the object at a later time if the obstruction is still present while using the driveway.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure generally pertains to systems and methods for notifying a driver of a vehicle that a hazardous condition may be present in an operating area. In some instances, the operating area may include a driveway of a home. A hazardous condition, such as the presence of an object, can be identified. The object can include, for example, a garbage can, another vehicle, a child's toy, or any other object or perceived risk that may pose a risk of being hit by a vehicle when operating the vehicle in the operating area.

While a user may witness an object in their driveway, they may forget to notify other users that operate vehicles in the driveway, such as other household members (e.g., a spouse or child). The user may themselves forget that the object is present after a period of time. In addition to the random or dynamic presence of objects in the driveway, there may be instances where objects are placed in the driveway at scheduled intervals, such as the placement of a garbage can once or twice per week. Because the presence of the garbage can is not a persistent condition or risk, users may forget that the garbage can may be present. Hazardous conditions can include dangerous weather conditions, such as rain, ice, or snow. Another hazardous condition could include debris, such as sand, rocks, oil, and so forth. Generally, the hazardous condition can include any object or phenomena that may pose a risk to a user operating a vehicle in the operating area.

The systems and methods herein allow for creation of a notification that can be pre-generated and stored for later presentation to users of the same or other vehicles. A user can identify an object that may pose a risk and create a message regarding that object, such as a warning message that can be stored and/or disseminated over a network to other connected devices/vehicles. When the same or another vehicle is being driven in the operating area at a later point in time, a driver of that vehicle can be presented the warning message.

In some instances, a vehicle sensor platform can be used to determine if the hazardous condition is still present. If the hazardous condition is not present, the warning message can be canceled for subsequent events. The warning message can be presented through a vehicle or through a connected device, such as a smartphone or smart watch. Warning messages can be scheduled and/or automatically removed based on various conditions. Warning message dissemination can occur between connected vehicles and/or smart home systems.

Illustrative Embodiments

Figure 1:
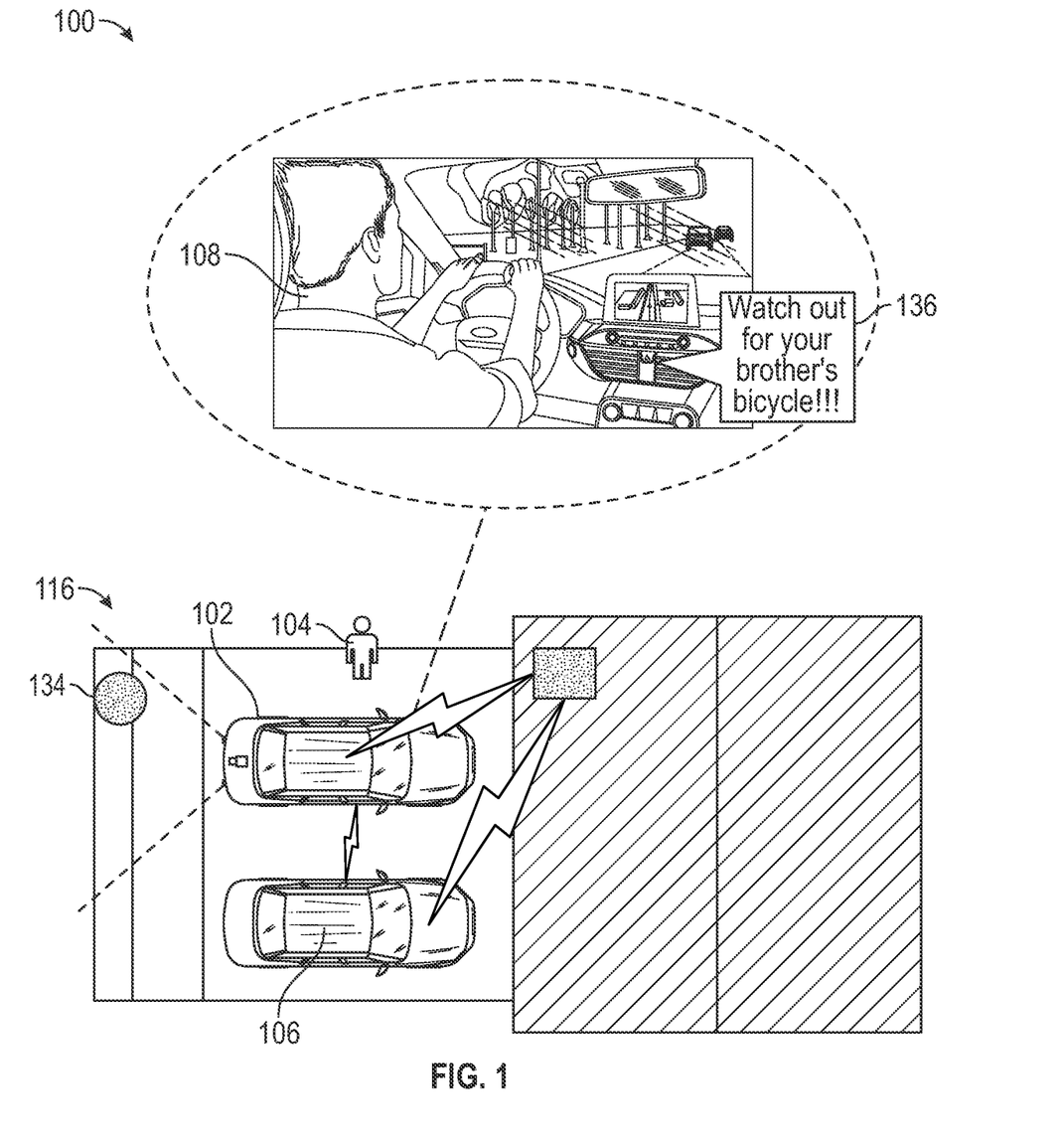
FIG. 1 depicts an illustrative architecture in which techniques and structures for providing the systems and methods disclosed herein may be implemented in accordance with one or more embodiments of the disclosure.

Turning now to the drawings, FIG. 1 depicts an illustrative architecture 100 in which techniques and structures of the present disclosure may be implemented. The architecture 100 can include a first vehicle 102, a first user 104, a second vehicle 106, a second user 108, a smart home system 110, a service provider 112, one or more connected user devices 114, and a network 115. The network 115 may include any one or a combination of multiple different types of networks, such as cable networks, the Internet, cellular networks, wireless networks, and other private and/or public networks. In some instances, the network 115 may include cellular, Wi-Fi, or Wi-Fi direct. In other instances, components of the environment can communicate using short-range wireless protocols such as Bluetooth®, near-field communications, infrared, and the like. The first vehicle 102 and the second vehicle 104 can communicate with one another over the network 115 using any vehicle-to-vehicle (V2V) communications protocol. The first vehicle 102 and/or the second vehicle 104 can communicate with the smart home system 110 and the service provider 112 or the over the network 115 using any vehicle-to-infrastructure (V2I) communications protocol. The first vehicle 102 and/or the second vehicle 104 can communicate with any one or more of the connected user devices 114 using a vehicle-to-everything (V2X) communications protocol. In some instances, the connected user devices 114 can be paired with the first vehicle 102 and/or the second vehicle 104 over a short-range wireless connection.

Generally, the first vehicle 102 may be operated by the first user 104. The first user 104 could include a first household member, such as a parent, a child, or a significant other, for example. The first vehicle 102 can be utilized in an operating area 116. The operating area 116 could include a driveway, or a driveway and adjacent locations to the driveway, such as a street, sidewalk, or other adjacent driveway. While examples disclosed herein may reference a driveway, the operating area 116 could include any defined area where a vehicle may operate. These defined areas can include locations where the vehicle is parked and may execute a backup or pull-forward maneuver. The hazardous condition can be encountered during the backup or pull-forward maneuver. Other example defined areas can include, but are not limited to, a parking spot, a charging station, street parking, and the like.

The first vehicle 102 can include a controller 118 that can comprise a processor 120 and memory 122. The memory 122 stores instructions that can be executed by the processor 120 to perform any of the hazard condition warning methods disclosed herein. When referencing operations performed by the controller 118, it will be understood that this includes the execution of instructions stored in the memory 122 by the processor 120. The first vehicle 102 can further include a human machine interface (HMI 124), a voice command system 126, and a vehicle sensor assembly 128. The vehicle sensor assembly 128 can comprise at least one camera 130 and at least one proximity sensor 132. The camera 130 can obtain images of the operating area 116. The controller 118 can be configured to sense or determine hazardous conditions in the operating area 116. For example, the controller 118 can utilize facial recognition to determine individuals or pattern recognition to identify objects such as vehicles, trashcans, toys, and so forth. An example hazardous condition is a trashcan 134, as illustrated behind the first vehicle 102. Other vehicle systems can be used such as weather or temperature systems to determine hazardous conditions such as ice, water, hail, and the like. In some instances, a plurality of external cameras and proximity sensors can be used to sense for hazardous conditions in a pattern around the vehicle.

Figure 2:
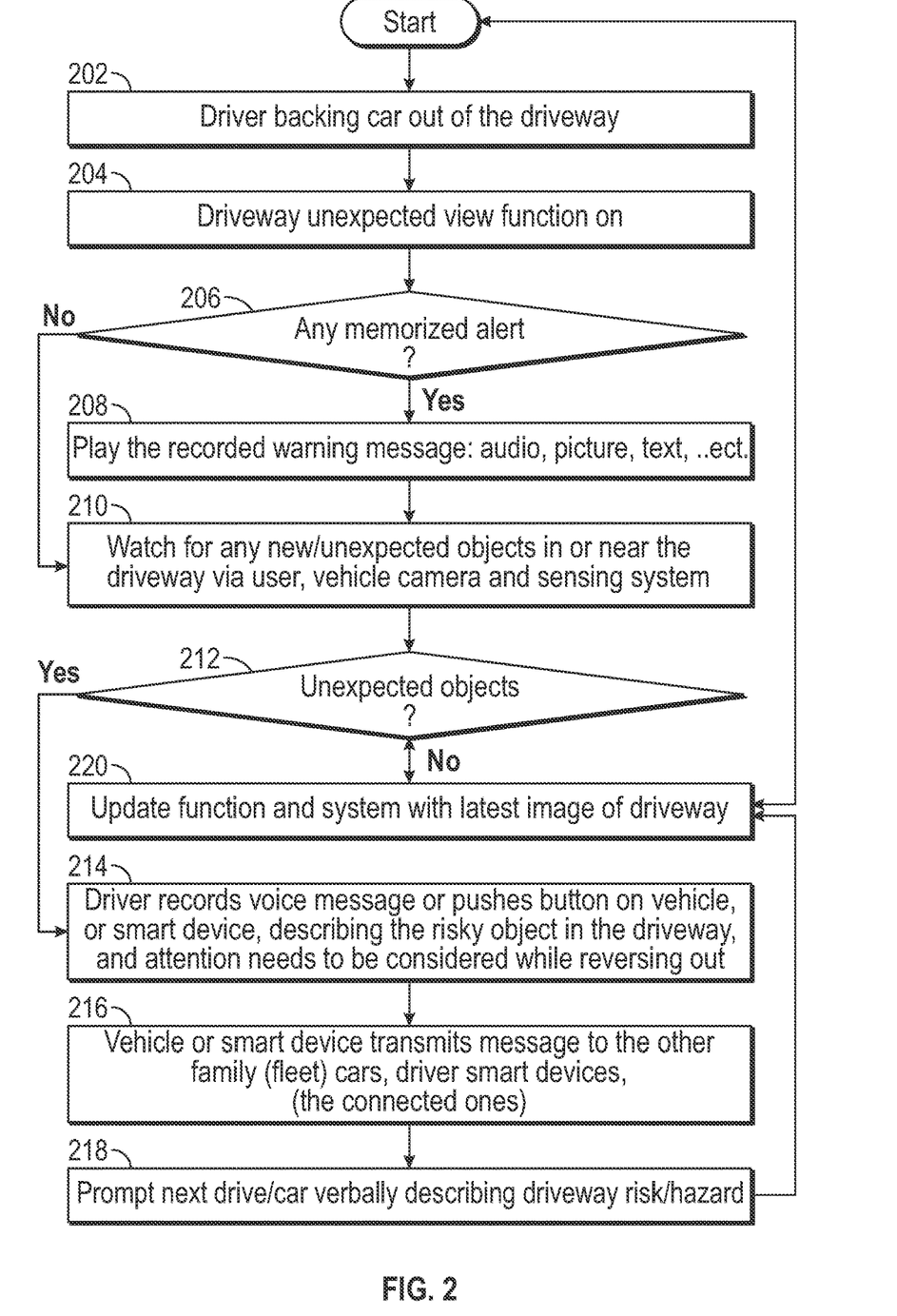
FIG. 2 is a flowchart of an example method of the present disclosure that pertains to hazardous condition detection and warning in accordance with one or more embodiments of the disclosure.

FIG. 2 is a flowchart of an example method of the present disclosure. FIGS. 1 and 2 will be referenced collectively. The method can be executed using elements of the architecture 100 of FIG. 1. The method can include a step 202 of determining when a vehicle is backing of a driveway. The driveway is an example operating area. As noted above, rather than backing out, the method could also be used to determine hazardous conditions when a driver is pulling a vehicle forward out of or into a driveway. The method can include a step 204 of activating an unexpected views (e.g., hazardous condition) warning system. Once enabled, the method can include a step 206 of determining if a warning message has been previously created and stored in memory of vehicle computing system (such as the controller 118). If a stored warning message is present, the method can include a step 208 of playing or presenting the warning message. This can include outputting the warning message as an audio message using the voice command system 126 or a picture or text through the HMI 124. An example warning message 136 in the form of a voice command is illustrated in FIG. 1. Alternatively, a message can be presented on a user device, such as a smartphone or watch of the driver. As noted throughout, the warning message comprises content that may be created by a prior user. For example, a parent can leave a message about an adjacently parked work vehicle. This warning message may assist another driver in avoiding the hazardous condition of the adjacently parked work vehicle.

If no warning message is present, the method can include a step 210 of determining the presence of a hazardous condition using vehicle systems, such as the vehicle sensor assembly 128. The vehicle sensor assembly 128 can determine if a hazardous condition is present in real-time or near-real time. Thus, if the hazardous condition that was initially identified is no longer present, but another hazardous condition is determined at drive-time, the driver can be warned. Thus, the controller 118 can be configured to detect another or different hazardous condition in the operating area that is not referenced in the warning message, as well as present another warning message for the driver to warn of the another hazardous condition in the operating area.

Also, in some instances, the vehicle sensor assembly 128 can determine if a hazardous condition is present at a first point in time and then generate, automatically, the warning message that is displayed to another driver at a second point in time. Thus, even if the first driver does not witness, or misses the hazardous condition, the controller 118 can utilize the vehicle sensor assembly 128 to automatically determine the presence of a hazardous condition. Also, vehicle sensor information can be used to determine if a hazardousous condition that was the subject of a warning message is no longer in existence. For example, if a first driver created a warning message regarding the presence of a parked vehicle near a driveway, the controller 118 can utilize information obtained from the vehicle sensor assembly 128 to determine if the parked vehicle is still present. For example, images obtained of the operating area 116 can be assessed for the presence of the parked vehicle. When the parked vehicle is not present, the warning message can be automatically deleted by the controller 118. In some instances, the warning message may be deleted after the warning message has been presented at least once and the subsequent driver confirms that the hazardous condition is no longer present.

A step 212, a determination is made as to whether an unexpected object (e.g., hazardous condition) is present. If a hazardous condition is determined, the method can include a step 214 of a human user inputting a warning message. The message could be recorded by pressing a button on the HMI 124, speaking or otherwise inputting the warning message, and optionally providing additional context for avoiding the hazardous condition. Again, the message could be input by the driver through use of a smart device, rather than through a vehicle system. The method can include a step 216 of storing and/or transmitting the warning message to other connected vehicles or connected devices. In step 218, the warning message can be displayed by one of these other connected vehicles or a connected user device. In step 220, the hazard warning functionality can be updated with learning behaviors or data obtained during vehicle operation, such as operating area image collection, processing, and storing.

Figure 3:
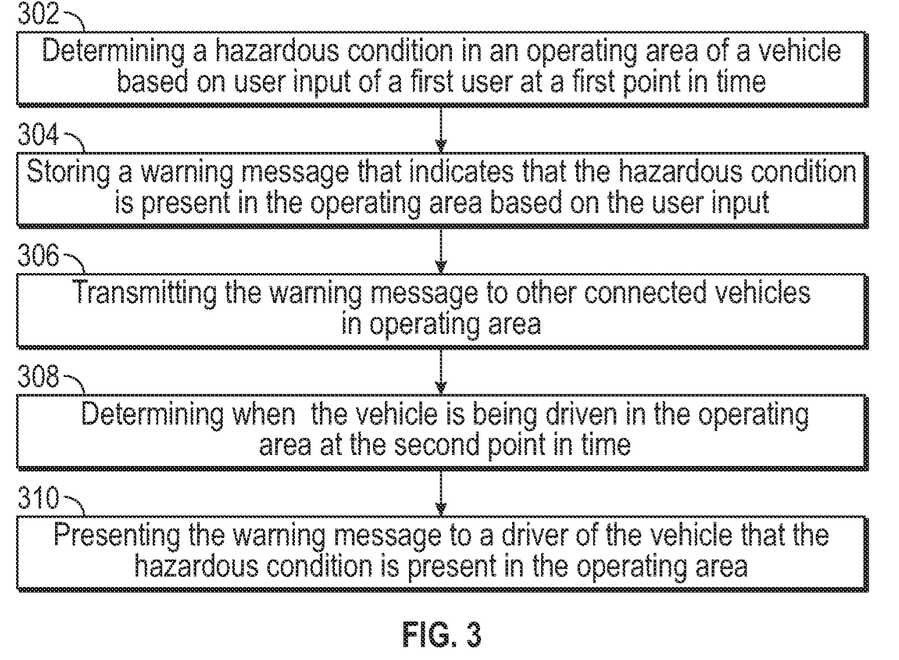
FIG. 3 is a flowchart of an example method of the present disclosure in accordance with one or more embodiments of the disclosure.

FIG. 3 is a flowchart of an example method. The method can include a step 302 of determining a hazardous condition in an operating area of a vehicle based on user input of a first user at a first point in time. For example, a parent who drives a first vehicle can input information into a vehicle system to remind other drivers of the first vehicle (or another connected vehicle) that a hazardous condition is present. The parent can create a voice note or enter a text-based message, as examples. In some examples, determining the hazardous condition can include obtaining and using output of a smart home sensor in combination with the user input. For example, a camera of a smart home system can be used to obtain images of the operating area. This data can be used in combination with the user input to confirm or verify that a hazardous condition is present. For example, if a warning message created by a user indicates that a trash can is present in a driveway, images obtained by a smart home camera can be used to verify the presence of the trash can. In some use cases, determining the hazardous condition can also include using output of a vehicle sensor in combination with the user input. In some instances, a combination of user input, vehicle sensor data, and smart home system data can be used to determine if a hazardous condition is present.

The method can include a step 304 of storing a warning message that indicates that the hazardous condition is present in the operating area based on the user input. The warning message could be stored at the first vehicle. The warning message can also be transmitted for storage and dissemination at the service provider 112. The service provider 112 could disseminate the warning message to other connected vehicles in the operating area.

Next, the method can include a step 306 of transmitting the warning message to other connected vehicles in operating area. Again, this can include the first vehicle transmitting the warning message to another connected vehicle or the transmission of the warning message to a connected user device.

The method can include a step 308 of determining when the vehicle is being driven in the operating area at the second point in time. For example, at a later point in the day or even on a subsequent day, a second driver (or even the first driver) may enter the vehicle. When the user starts the vehicle, if a warning message is stored at the vehicle (or is received from the service provider 112), the warning message can be determined and retrieved. The method can include a step 310 of presenting the warning message to a driver of the vehicle that the hazardous condition is present in the operating area.

In various examples, once a hazardous condition has been identified and a warning message created, the method can include steps of determining that the hazardous condition is no longer present based on output of vehicle sensor and deleting the warning message when the hazardous condition is no longer present. Also, as noted above, the method can include detecting another hazardous condition in the operating area that is not referenced in the warning message. This step can be performed while the vehicle is being operated or during movement of the vehicle into the operating area. Another warning message can be presented to the driver to warn them of the hazardous condition in the operating area.

Figure 4:
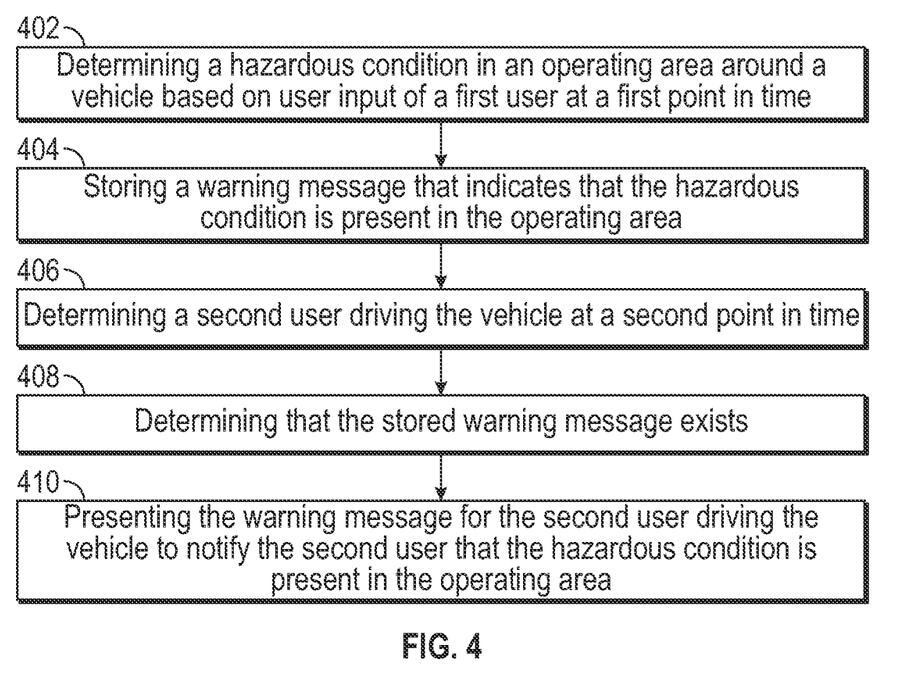
FIG. 4 is a flowchart of an example method of the present disclosure in accordance with one or more embodiments of the disclosure.

FIG. 4 is a flowchart of another method of the present disclosure. The method can include a step 402 of determining a hazardous condition in an operating area around a vehicle based on user input of a first user at a first point in time. The method can further include a step 404 of storing a warning message that indicates that the hazardous condition is present in the operating area. The method can further include a step 406 of determining the first user or a second user driving the vehicle or another vehicle at a second point in time, as well as a step 408 of determining that the stored warning message exists. This can include determining if a warning message has been stored at the vehicle level or at a service provider level. The method can include a step 410 of presenting the warning message for the first or second user driving the vehicle to notify the first or second user that the hazardous condition is present in the operating area.

Figure 5:
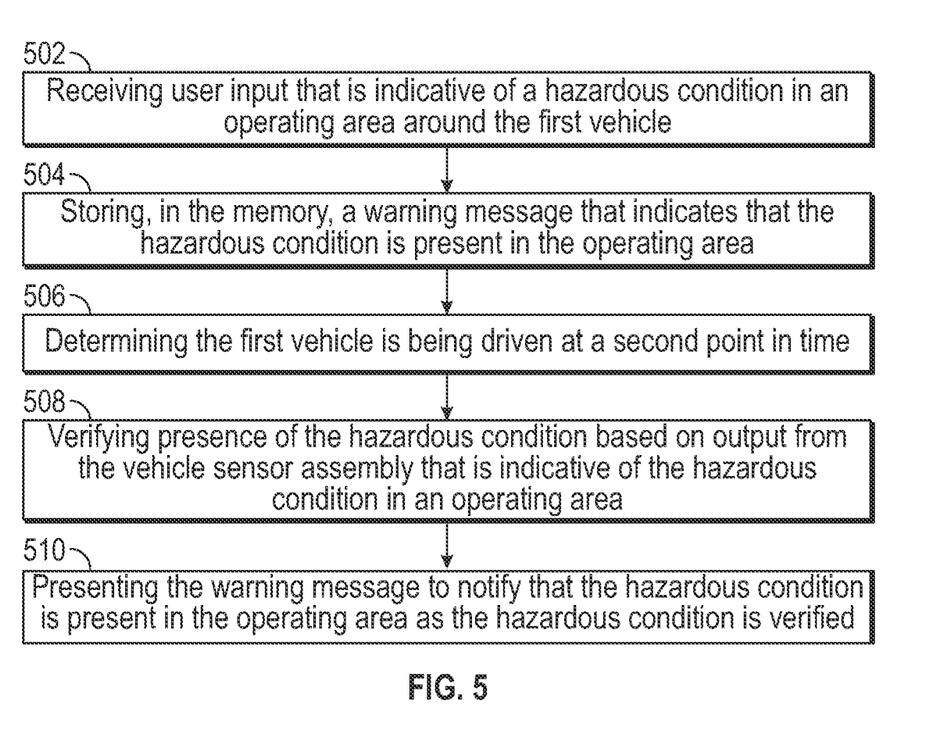
FIG. 5 is a flowchart of an example method of the present disclosure in accordance with one or more embodiments of the disclosure.

FIG. 5 is another flowchart of an example hazardous condition warning method. The method can include a step 502 of receiving user input that is indicative of a hazardous condition in an operating area around the first vehicle. As noted above, this can include a user entering a message into a HMI or voice command system.

The method can include a step 504 of storing, in the memory, a warning message that indicates that the hazardous condition is present in the operating area. When the vehicle is driven at a later point in time, the method can include a step 506 of determining the first vehicle is being driven at a second point in time. The method can include a step 508 of verifying presence of the hazardous condition based on output from the vehicle sensor assembly that is indicative of the hazardous condition in an operating area. As noted above, verification of the hazardous condition can be based on vehicle sensor data (e.g., camera or proximity sensor), or data from a smart home system. That is, the vehicle can couple with a smart home sensor over a network. A controller of the vehicle can receive output of the smart home sensor that is indicative of the hazardous condition in an operating area. If the output of the smart home sensor indicates that hazardous condition is present, the hazardous condition is considered to be verified. The same process can be performed using vehicle sensor data. The method can include a step 510 of presenting the warning message to notify that the hazardous condition is present in the operating area as the hazardous condition is verified.

To be sure, some examples provided herein may reference a first driver, such as a first household member (e.g., a parent, child, or spouse), leaving a second driver a warning message with respect to a first vehicle. However, the hazardous condition warning features disclosed herein can enable the delivery of a warning message to a second or additional vehicles in the operating area. For example, a plurality of vehicles used by a family may exchange warning messages in accordance with the present disclosure. Also, warning messages can be created and disseminated using connected user devices.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining a hazardous condition in an operating area of a vehicle based on a user input at a first point in time;
   storing a warning message that indicates that the hazardous condition is present in the operating area based on the user input;
   determining that the vehicle is being driven in the operating area at a second point in time;
   verifying a presence of the hazardous condition based on an output from a vehicle sensor that is indicative of the hazardous condition in the operating area at the second point in time; and
   outputting the warning message a user of the vehicle to provide a notification of the hazardous condition based on the hazardous condition being verified.

2. The method according to claim 1, further comprising transmitting the warning message to other connected vehicles in operating area.

3. The method according to claim 1, wherein determining the hazardous condition further includes using an output of a smart home sensor in combination with the user input.

4. The method according to claim 1, wherein determining the hazardous condition further includes using an output of a vehicle sensor in combination with the user input.

5. The method according to claim 1, further comprising:
   determining that the hazardous condition is no longer present based on the output from the vehicle sensor; and
   deleting the warning message when the hazardous condition is no longer present.

6. The method according to claim 1, further comprising presenting the warning message to a connected device.

7. The method according to claim 1, further comprising:
   during movement of the vehicle into the operating area, detecting a second hazardous condition in the operating area that is not referenced in the warning message; and
   presenting a second warning message to the driver to warn of the second hazardous condition in the operating area.

8. The method according to claim 1, wherein the operating area comprises a backup area or a pull-forward area relative to the vehicle.

9. A system, comprising:
   a processor; and
   a memory for storing instructions, the processor executing the instructions to:
   receive a user input of a first user at a first point in time, the user input indicating that a hazardous condition will exist in an operating area around a first vehicle at a second time;
   store a warning message that indicates that the hazardous condition will exist in the operating area at the second time;
   determine a second user is driving a second vehicle in the operating area at the second time determine that the warning message is stored;
   verify a presence of the hazardous condition based on an output from a vehicle sensor that is indicative of the hazardous condition in the operating area at the second time; and
   present the warning message to the second user in driving the second vehicle to notify the second user that the hazardous condition is present in the operating area.

10. The system according to claim 9, wherein determining the hazardous condition further includes using an output of a smart home sensor in combination with the user input.

11. The system according to claim 9, wherein determining the hazardous condition further includes using an output of a vehicle sensor in combination with the user input.

12. The system according to claim 9, wherein the processor is configured to:
    determine that the hazardous condition is no longer present based on the output of a vehicle sensor; and
    delete the warning message when the hazardous condition is no longer present.

13. The system according to claim 9, wherein the operating area comprises a backup area or a pull-forward area.

14. The system according to claim 9, wherein the processor is configured to:
    detect a second hazardous condition in the operating area that is not referenced in the warning message; and
    present a second warning message to the second user to warn of the second hazardous condition in the operating area.

15. The system according to claim 14, wherein the processor is configured to update the warning message with information that is indicative of the second hazardous condition.

16. A first vehicle, comprising:
    a vehicle sensor assembly; and
    a controller comprising a processor and a memory for storing instructions, the processor executing the instructions to:
    receive user input that is indicative of a hazardous condition in an operating area around the first vehicle;
    store, in the memory, a warning message that indicates that the hazardous condition is present in the operating area;
    determine the first vehicle is being driven at a second point in time in the operating area;
    verify a presence of the hazardous condition based on output from the vehicle sensor assembly that is indicative of the hazardous condition in the operating area; and
    output the warning message to provide a notification of the hazardous condition based on the hazardous condition being verified.

17. The first vehicle according to claim 16, wherein the processor is configured to receive an output of a smart home sensor that is indicative of the hazardous condition.

18. The first vehicle according to claim 16, wherein the processor is configured to transmit the stored warning message to a second vehicle located within proximity to the operating area.

19. The first vehicle according to claim 16, wherein the processor is configured to transmit the warning message to a connected device in the operating area.

20. The first vehicle according to claim 16, wherein the processor is configured to:
   detect a second hazardous condition in the operating area that is not referenced in the warning message; and
   present a second warning message to warn of the second hazardous condition in the operating area.

* * * * *